United States Patent
Jung et al.

(10) Patent No.: US 11,975,627 B2
(45) Date of Patent: May 7, 2024

(54) ELECTRIC VEHICLE CHARGING SYSTEM INCLUDING USER AUTHENTICATION, CHARGING AND PAYMENT

(71) Applicant: DAEYOUNG CHAEVI CO., LTD., Daegu (KR)

(72) Inventors: Min Kyo Jung, Daegu (KR); Kyung Soo Bae, Suwon-si (KR); Sang Ho Kim, Yongin-si (KR)

(73) Assignee: DAEYOUNG CHAEVI CO., LTD., Daegu (KR)

( * ) Notice: Subject to any disclaimer, the term of this patent is extended or adjusted under 35 U.S.C. 154(b) by 449 days.

(21) Appl. No.: 17/443,227

(22) Filed: Jul. 22, 2021

(65) Prior Publication Data

US 2022/0305943 A1    Sep. 29, 2022

(30) Foreign Application Priority Data

Mar. 23, 2021    (KR) ........................ 10-2021-0037605

(51) Int. Cl.
| | |
|---|---|
| *B60L 53/66* | (2019.01) |
| *B60L 53/30* | (2019.01) |
| *B60L 53/60* | (2019.01) |
| *B60L 53/65* | (2019.01) |
| *G07F 15/00* | (2006.01) |
| *H02J 7/00* | (2006.01) |
| *G06Q 50/40* | (2024.01) |

(52) U.S. Cl.
CPC .......... *B60L 53/665* (2019.02); *B60L 53/305* (2019.02); *B60L 53/60* (2019.02); *B60L 53/65* (2019.02); *B60L 53/66* (2019.02); *G07F 15/005* (2013.01); *H02J 7/00045* (2020.01); *G06Q 50/40* (2024.01)

(58) Field of Classification Search
CPC ...... B60L 53/665; B60L 53/305; B60L 53/65; B60L 53/60; B60L 53/66; G07F 15/005; G06Q 50/30; H02J 7/00045
USPC ........................................................ 320/109
See application file for complete search history.

(56) References Cited

U.S. PATENT DOCUMENTS

| | | | | |
|---|---|---|---|---|
| 9,219,364 | B2 * | 12/2015 | Tomiyama | H02J 13/00004 |
| 10,988,044 | B2 * | 4/2021 | Erb | G06Q 50/06 |
| 11,091,046 | B2 * | 8/2021 | Wild | G06Q 30/0639 |
| 11,581,759 | B2 * | 2/2023 | Tachiwa | H02J 50/80 |
| 2012/0239571 | A1 * | 9/2012 | Boot | B60L 53/65 |
| | | | | 700/297 |

(Continued)

FOREIGN PATENT DOCUMENTS

| | | | | |
|---|---|---|---|---|
| KR | 20150010017 A | * | 1/2015 | ............. G06Q 20/14 |
| WO | WO-2021031061 A1 | * | 2/2021 | ............ B60L 53/305 |

*Primary Examiner* — Richard Isla
*Assistant Examiner* — Manuel Hernandez
(74) *Attorney, Agent, or Firm* — BROADVIEW IP LAW, PC

(57) ABSTRACT

An electric vehicle charging system provides member authentication, charging, and simple payment. The system improves convenience for a customer by extracting a unique Media Access Control (MAC) address of a vehicle and performing membership registration procedure, member authentication procedure, simple payment, and charging procedure using the extracted MAC address of the vehicle and customer information provided at the time of membership registration. The system increases customer satisfaction by providing a customer with simple payment and a payment amount along with completion of the charging.

11 Claims, 7 Drawing Sheets

(56) References Cited

U.S. PATENT DOCUMENTS

2014/0067680 A1\* 3/2014 Turner ............... G06Q 20/3276
705/44
2016/0031338 A1\* 2/2016 Penilla .................... B60L 53/30
320/109
2016/0297316 A1\* 10/2016 Penilla ............... G06Q 30/0232

\* cited by examiner

ELECTRIC VEHICLE CHARGING SYSTEM INCLUDING USER AUTHENTICATION, CHARGING AND PAYMENT

CROSS-REFERENCE TO RELATED APPLICATION

This application claims priority to Korean Patent Application No. 10-2021-0037605 filed Mar. 23, 2021, the contents of which are incorporated herein by reference.

FIELD OF THE INVENTION

The present invention relates to a charging system for member authentication, charging, and simple payment that is capable of improving the convenience of a customer by extracting a unique Media Access Control (MAC) address of a vehicle and performing a membership registration procedure, a member authentication procedure, simple payment, and a charging procedure using the extracted MAC address of the vehicle and customer information provided at the time of membership registration, and in particular, capable of increasing the customer satisfaction by providing a customer with simple payment and a payment amount along with completion of the charging.

BACKGROUND OF THE INVENTION

In general, payment methods in electric vehicle charging systems may be divided into simple payment and credit card payment.

First, in the case of a simple payment method, a radio frequency identification (RFID) card is issued and tagged by an RF card reader, or a membership number is entered so that approval is performed and payment is performed. In this case, when the card is lost or not carried at the time of charging or when the membership number is not remembered, payment becomes virtually impossible. In addition, when entering the membership number, the entry of the number may be inconvenient, and the membership number may be exposed to a risk of theft during the process of entering the membership number.

Next, credit card payment methods are classified into an approval-approval-cancellation method and a partial cancellation method. The approval-approval-cancellation method is inconvenient in that a customer needs to perform prepayment before charging the card, and then when the charging is completed, cancel the prepayment by inserting the card again, and perform actual payment.

In addition, in the partial cancellation method, a customer performs prepayment before charging the card, and when the charging is completed, a server partially cancels the remaining amount of the prepayment except for the actual charging amount money.

In this case, a payment gateway (PG) company estimates an amount of the prepayment excluding an amount corresponding to the actual charging amount money as a purchase for the card company, but a text message about the partial cancellation is delivered from the card company to the user two or three days later, or may not be transmitted depending on the card company. Accordingly, there is an inconvenience in that customers complain about receiving detailed information of payments late or not receiving the detailed information at all.

In addition, in the partial cancellation method, the payment is entrusted to the P.G company and performed, which increases relevant fees.

SUMMARY OF THE INVENTION

Technical Problem to be Solved

To solve the above-described problems, the present invention provides a charging system for member authentication, charging, and simple payment in which a unique Media Access Control (MAC) address of a vehicle is extracted and a membership registration procedure, a member authentication procedure, simple payment, and a charging procedure are performed using the extracted MAC address of the vehicle and customer information provided at the time of membership registration so that the convenience of customers is improved, and in particular, a customer is provided with simple payment and a payment amount along with completion of the charging so that customer satisfaction is provided.

The present invention provides a charging system for member authentication, charging, and simple payment in which a plug and charge (PnC) membership registration after a membership registration is managed by matching MAC address information extracted from a vehicle at a time of connecting a charger to a charging cable of the vehicle with customer information and performing an update, and thus the advantage of a simple payment by a payment system through a membership registration is ensured, and without carrying a membership card issued at the time of membership registration, a PnC member is authenticated by only connecting the charger to the charging coupler of the vehicle, and thus a member management service that maximizes the customer convenience is provided.

The present invention provides a charging system for member authentication, charging, and simple payment in which a MAC address extracted from a vehicle is stored and managed, and information about an outstanding balance is stored in the MAC address stored and managed so that a charging history of a vehicle having used the charging system is identified from the extracted MAC address, thereby increasing system operation efficiency.

Technical Solution

One aspect of the present invention provides a charging system for member authentication, charging, and simple payment, which includes a management server, a charger, and a payment system, the charging system allowing the performance of the steps of: (a) in response to a member authentication unit and a membership registration unit displayed on a main screen of the charger being selected, authenticating a member or initiating a membership registration procedure; (b) in the case of a registered member, or after registering a payment device in the payment system and providing the payment system with customer information according to the membership registration procedure to perform membership registration, identifying whether to register for a plug and charge (PnC) membership; and for the PnC membership registration, connecting the charger to a charging coupler of the vehicle to extract a Media Access Control (MAC) address of the vehicle; (c) from the extraction of the MAC address of the vehicle, allowing a dynamic quick response (QR) code to be generated on the main screen of the charger, and through recognition of the dynamic QR code by a terminal of a customer, matching the MAC address of the vehicle with the customer information obtained at the time of the membership registration and performing an update; (d) in response to being authenticated as a member in the step (a) or according to whether the membership registration has been performed or the PnC membership registration has been performed in the step (b) and the step (c), initiating a charging; and (e) after the charging according to the step (d), transmitting payment information to the terminal of the customer and terminating the charging through payment approval.

In a case in which member in the member authentication unit is selected, when a membership card possessed by the customer is tagged on the charger, a membership number of the membership card is transmitted to the management server to approve member authentication, and when the charger is connected to the charging coupler of the vehicle, charging may be initiated and a MAC address may be extracted from the vehicle and transmitted to the management server, wherein the management server may match the MAC address of the vehicle with customer information and performs an update.

In a case in which PnC member in the member authentication unit is selected, when the charger is connected to the charging coupler of the vehicle, charging may be initiated and a MAC address is extracted from the vehicle and transmitted to the management server so that member authentication may be approved, wherein, in response to non-PnC member, the management sever may transmit a response indicating the non-PnC member to the charger and the charger terminates charging.

The non-PnC member may select PnC registration in the membership registration unit to perform the PnC membership registration, the charging, and the payment procedures according to steps (b) to (e).

After the charging is completed, the payment information may be transmitted to the terminal of the customer, and the charging is terminated by the payment.

In a case in which non-member in the member authentication unit is selected, a charging level or a charging amount money may be set in the charger, and the charger may be connected to the charging coupler of the vehicle so that charging may be initiated, and a MAC address may be extracted from the vehicle and transmitted to the management server so that, in response to the MAC address being present in an updated database in the management server, the presence of an outstanding balance for the MAC address of the vehicle may be checked.

In response to no outstanding balance for the MAC address of the vehicle, the payment information is transmitted to the terminal of the customer along with termination of the charging.

After the payment information is transmitted to the terminal of the customer, whether the payment is normally performed may be checked, and in response to the payment not being performed or only a partial payment having been performed, an update may be performed on outstanding balance information for the MAC address of the vehicle.

In response to the presence of the outstanding balance for the MAC address of the vehicle, the charging may be terminated, and through a payment process for the outstanding balance, the charging may be continued.

After the charging is completed in the charger, in a case in which the customer pays the charging amount money using a credit card, postpaid payment may be allowed.

Effects of the Invention

With the charging system for member authentication, charging, and simple payment according to the present invention, a unique Media Access Control (MAC) address of a vehicle is extracted and a membership registration procedure, a member authentication procedure, simple payment, and a charging procedure are performed using the extracted MAC address of the vehicle and customer information provided at the time of membership registration, and thus the convenience of customers can be improved, and in particular, a customer is provided with a simple payment and a payment amount along with completion of the charging so that the customer satisfaction can be provided.

According to the present invention, plug and charge (PnC) membership registration after membership registration is managed by matching MAC address information extracted from a vehicle at the time of connecting a charger to a charging cable of the vehicle with customer information and performing an update, and thus the advantage of a simple payment by a payment system through membership registration can be ensured, and without carrying a membership card issued at the time of membership registration, a PnC member is authenticated by only connecting the charger to the charging coupler of the vehicle, and thus a member management service that maximizes customer convenience can be provided.

According to the present invention, a MAC address extracted from a vehicle is stored and managed, and information about an outstanding balance is stored in the MAC address stored and managed so that a charging history of a vehicle having used the charging system can be identified from the extracted MAC address, thereby increasing system operation efficiency.

DETAILED DESCRIPTION OF THE INVENTION

Figure 1:
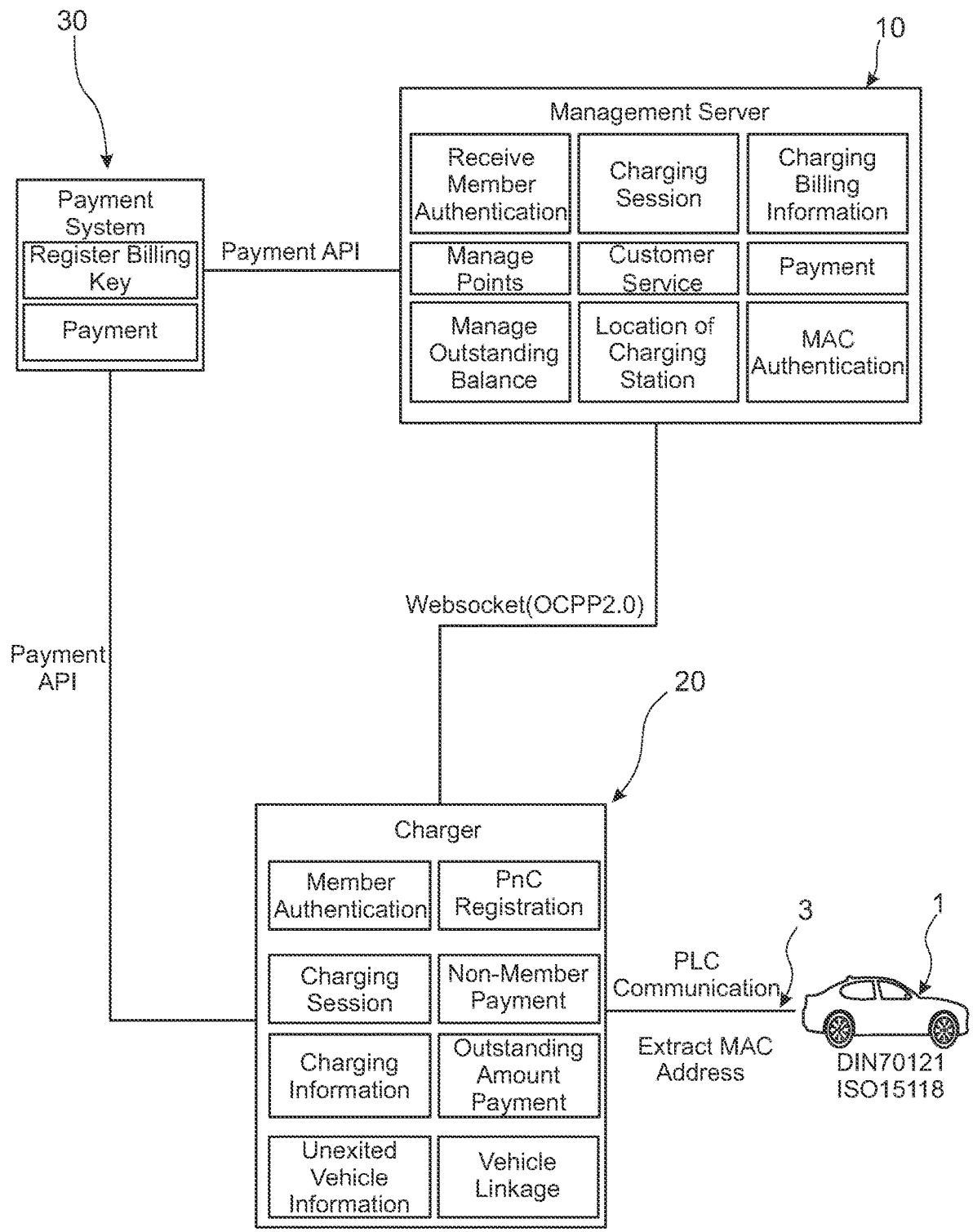
FIG. 1 is a conceptual diagram illustrating a system for member authentication, charging, and simple payment.

In order to fully understand the present invention, the operational advantages of the present invention, and the objects achieved by the practice of the present invention, reference should be made to the accompanying drawings, which illustrate preferred embodiments of the present invention, and the contents described in the accompanying drawings.

First, terms used herein are used only to describe specific embodiments and are not intended to limit to the present invention. As used herein, the singular forms "a" and "an" are intended to include the plural forms as well, unless the context clearly indicates otherwise. It will be further understood that the terms "comprises," "comprising," "includes,"

and/or "including," when used herein, specify the presence of stated features, integers, steps, operations, elements, and/or components but do not preclude the presence or addition of one or more other features, integers, steps, operations, elements, components, and/or groups thereof.

In the description of the embodiments, the detailed description of related known functions or constructions will be omitted herein to avoid making the subject matter of the present disclosure unclear.

As illustrated in FIGS. 1 to 4, a charging system for member authentication, charging, and simple payment according to the present invention includes a management server 10, a charger 20, and a payment system 30, and performs procedures for member authentication, membership registration, charging, and payment.

That is, in the charging system according to the present invention, the management server 10 provides services of member authentication reception, a charging session, charging billing information, point management, a customer center, payment, outstanding balance management, a charging station location, Media Access Control (MAC) authentication, etc.

In addition, the charger 20 installed on the site is connected to the management server 10 through WebSocket (OCPP2.0) according to an international communication protocol and performs services of member authentication, plug and charge (PnC) registration, a charging session, non-member payment, charging information, outstanding balance payment, unexited vehicle information, vehicle linkage, etc.

The payment system 30 is connected to the management server 10 and the charger 20 to enable communication in the form of a payment application programming interface (API) and performs services such as billing key registration, payment, etc.

Here, the billing key is an encryption key for payment that enables repayment, such as subscription regular payments, payments on a standardized basis, etc., at a desired time from card information of a registered customer. The registration of a billing key is performed the first time through a payment gateway (PG) company and performed in the same way as a general authentication method through the payment window of the PG company by transmitting data through a payment window of the PG company, and the billing key is directly issued through an API provided by the PG company. In the registration of the billing key according to the present invention, the billing key is issued using card information of the customer at the time of membership registration and registered.

Figure 2:
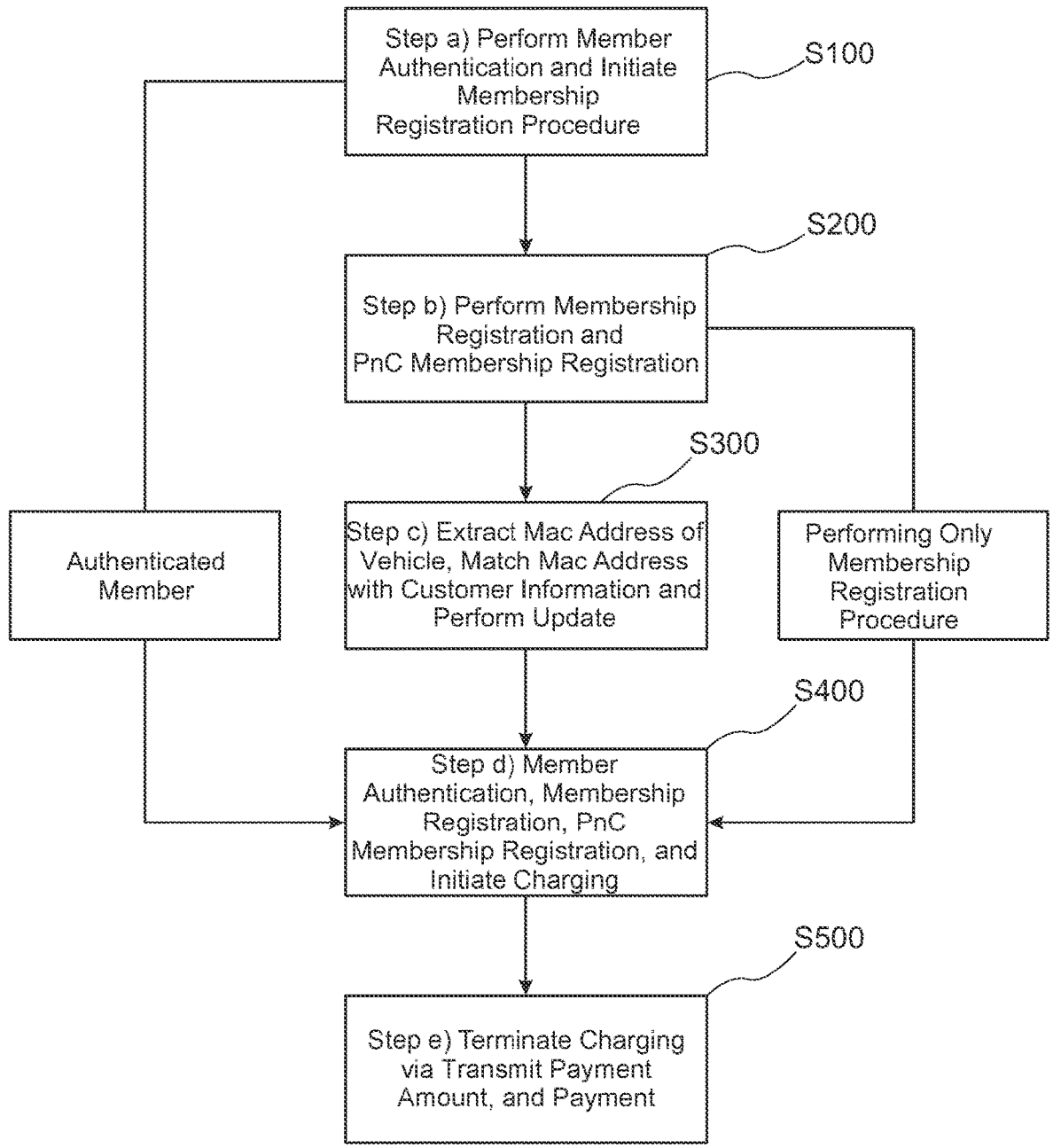
FIG. 2 is a flowchart showing a charging system according to the present invention.

As illustrated in FIGS. 1 and 2, the charging system according to the present invention allows the performance of a step (a) of performing member authentication and initiating a membership registration procedure (S100), a step (b) for membership registration and PnC membership registration (S200), a step (c) of extracting a MAC address of a vehicle and matching the extracted MAC address and customer information and performing an update (S300), a step (d) of initiating charging after the member authentication, the membership registration, and the PnC membership registration (S400), and a step (e) of transmitting a payment amount to the customer and terminating the charging through payment (S500).

As illustrated in FIGS. 1 and 2, the step (a) (S100) according to the present invention selects a member authentication unit 23 and a membership registration unit 25 displayed on a main screen 21 of a charger 20 to authenticate a member or initiate a membership registration procedure.

First, at the bottom of the main screen 21 of the charger 20, the member authentication unit 23 including member, PnC, and non-member according to registration types is arranged, and on the upper side of the member authentication unit 23, the membership registration unit 25 including quick response (QR) code and PnC registration is arranged.

Therefore, in the case of an existing registered member, a PnC member, or a non-member who does not desire to become a member, one item in the member authentication unit 23 may be selected to proceed with charging.

In addition, in the case of a non-member or an existing registered member but not a PnC member, one item of the membership registration unit 25 is selected to perform membership registration, perform PnC membership registration, or perform membership registration and PnC membership registration together. Here, since the PnC membership registration is based on the membership registration, the PnC membership registration is allowed in the case of a customer who has registered for the membership or after membership registration in the case of a customer who has not registered for the membership.

Here, PnC is an abbreviation of 'Plug and charge' and refers to a member who has registered for a membership according to a membership registration procedure to be described below and then is managed by matching of MAC address information through an extraction of a unique MAC address of a vehicle and customer information and performing an update. That is, a PnC member enjoys the advantages of simple payment by the payment system 30 through the membership registration, and even without carrying a membership card issued at the time of the membership registration, is authenticated as a PnC member only by connecting the charger to the charging coupler of the vehicle, which means a member management service that maximizes customer convenience.

Figure 3:
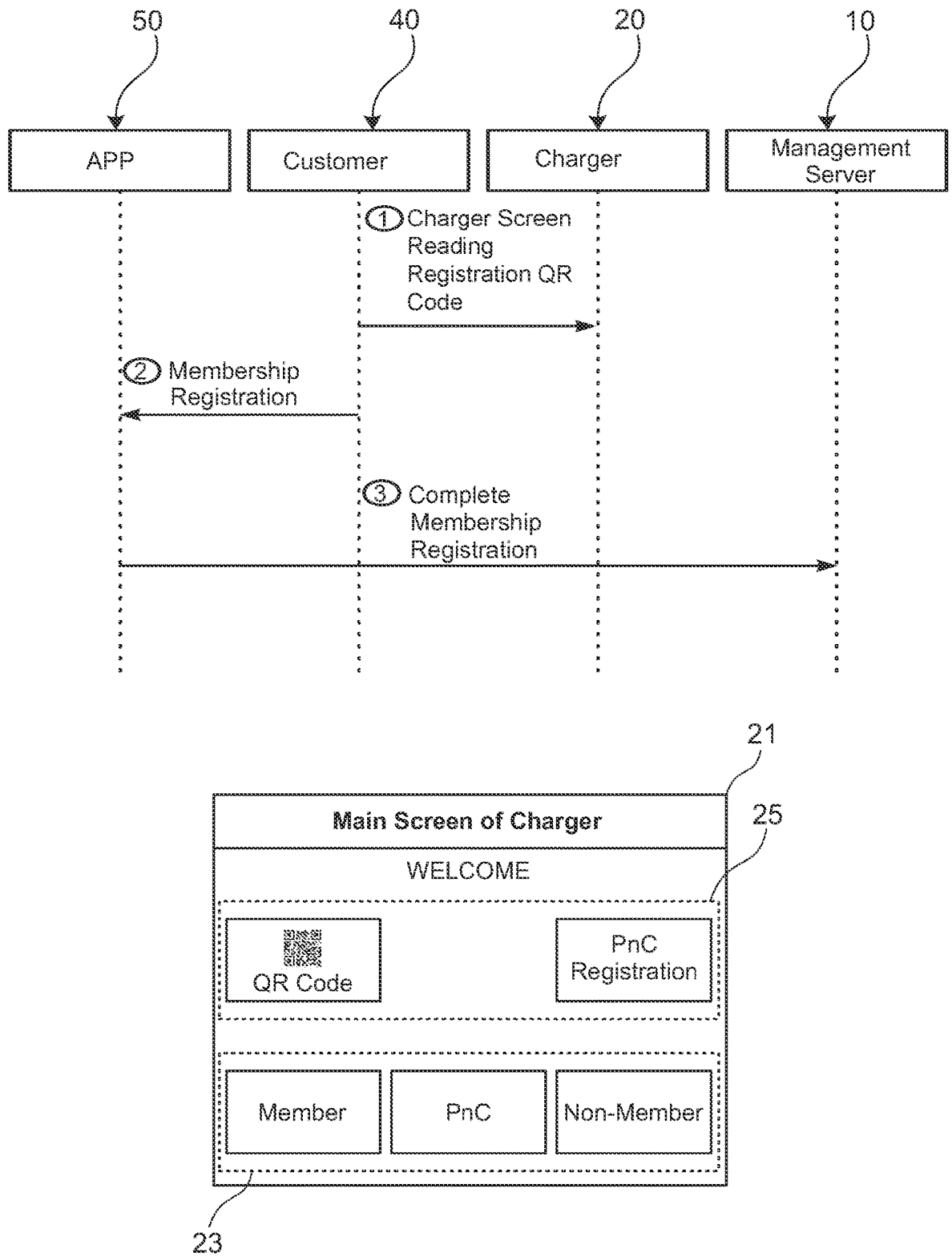
FIG. 3 is a conceptual diagram illustrating a membership registration procedure in the charging system according to the present invention.
Figure 4:
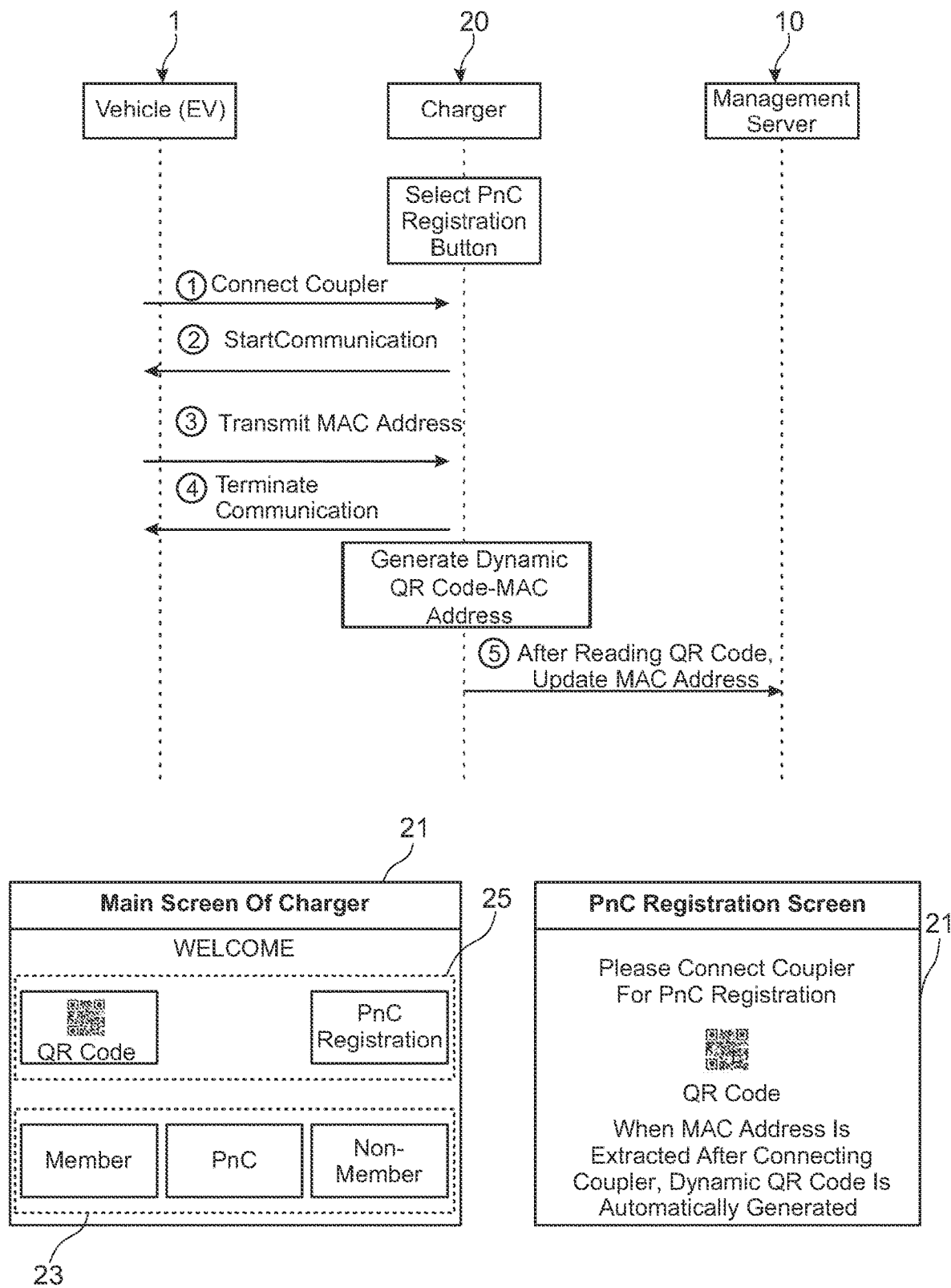
FIG. 4 is a conceptual diagram illustrating a PnC membership registration procedure in the charging system according to the present invention.

As illustrated in FIGS. 1 to 3, the step (b) (S200) according to the present invention is a process of, in the case of a registered member or after performing membership registration according to a membership registration procedure, identifying whether to register for a PnC membership; and for the PnC membership registration, connecting the charger 20 to the charging coupler of the vehicle 1 to extract a MAC address of the vehicle 1.

First, the membership registration according to the membership registration procedure is performed by scanning the 'QR code' of the membership registration unit 25 displayed on the main screen 21 of the charger with a dedicated application 50 stored in a terminal of a customer 40, that is, a smartphone, so that the membership registration is initiated. In this case, the customer enters membership registration information provided by the dedicated application 50, and at this time, the customer 40 may provide card information used by the customer 40 to have a billing key registered and issued through the payment system 30. Once the billing key is registered and issued as described above, simple payment is performable without providing a separate card when the customer 40 performs charging using the charging system.

As the membership registration is performed as described above, the customer information is transmitted to the management server 10 so that the membership registration is terminated.

The membership registration may be performed as described, and a customer who has been already registered as a member may register for a PnC membership. When the 'PnC registration' of the membership registration unit 25 is selected for a PnC membership registration, a message 'Please connect a coupler for PnC registration' is displayed on the main screen 21 of the charger. When the charger 20 is connected to the charging coupler of the vehicle 1 according to the message, the charger 20 extracts a unique Mac address from the vehicle 1. Because a charging cable 3 connected to the charging coupler is configured to enable programmable logic controller (PLC) communication, only the connecting of the charger 20 to the charging coupler of the vehicle 1 through the charging cable 3 allows the address to be extracted and transmitted to the charger 20. In addition, communication between the charger 20 and the vehicle 1 is started through the charging cable 3 at the same time as the charging coupler is connected, but the communication may be preferably terminated immediately after the MAC address of the vehicle 1 is extracted, so that personal information of the customer is inaccessible.

As illustrated in FIGS. 1 to 4, the step (c) (S300) according to the present invention is a process of, from the extraction of the MAC address of the vehicle 1, causing a dynamic QR code to be generated on the main screen 21 of the charger 20, and through recognition of the dynamic QR code by the terminal of the customer 40, matching the MAC address of the vehicle 1 with the customer information obtained at the time of membership registration and performing an update.

That is, when the MAC address is extracted from the vehicle 1 and transmitted to the charger 20 in the step (b) (S200), a dynamic QR code is generated and displayed on the main screen 21 of the charger 20 from the extraction of the MAC address of the vehicle 1. When the dynamic QR code is scanned by the customer 40 through the dedicated application 50 and read, the management server 10 matches the customer information at the time of membership registration with the extracted MAC address of the vehicle 1 and performs an update.

In this case, the update, when the charger 20 is connected to the charging coupler of the vehicle 1 to use the charging system according to the present invention, performs steps of extracting the MAC address of the vehicle 1 and storing and managing the extracted MAC address in the database of the management server 10. Therefore, even in the case of a non-member, when the charging system according to the present invention is used, a charging history is continuously updated to be stored and managed through the MAC address stored in the database.

As illustrated in FIGS. 1, 2, and 4 to 7, the step (d) (S400) according to the present invention is a process of, in response to being authenticated as a member in the step (a) (S100) or according to whether the membership registration has been performed or the PnC membership registration has been performed in the steps (b) (S200) and the step (c) (S300), initiating charging (S400).

In the step (d) (S400), when the customer 40, who is registered as a member, desires charging, the charging is initiated by authenticating and approving that the customer 40 is a registered member, but the member authentication and approval procedure is divided into a case in which the customer has registered for the membership and a case in which the customer has registered for the PnC membership as well as the membership.

Figure 5:
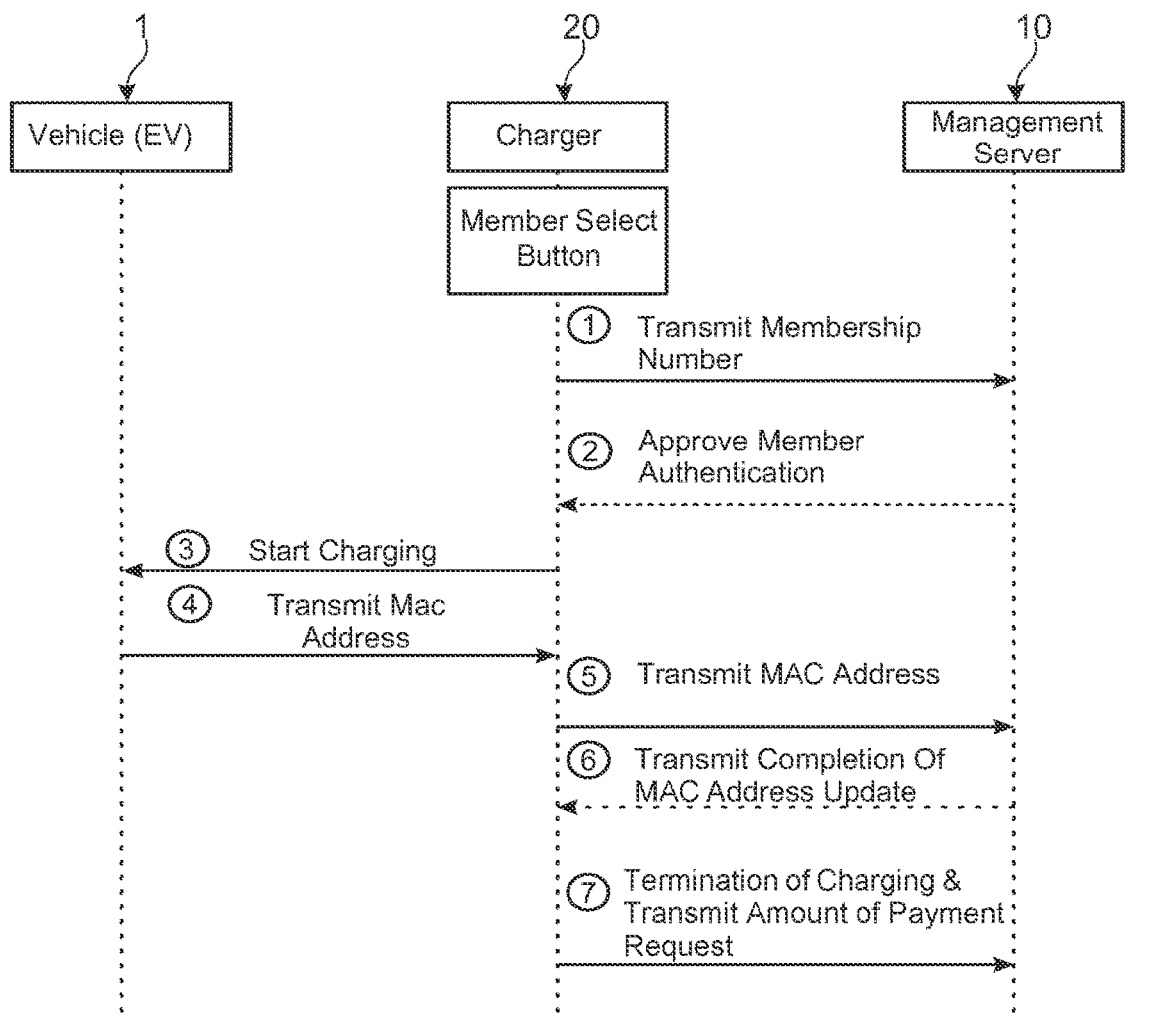
FIG. 5 is a conceptual diagram illustrating a member charging procedure in the charging system according to the present invention.
Figure 5:
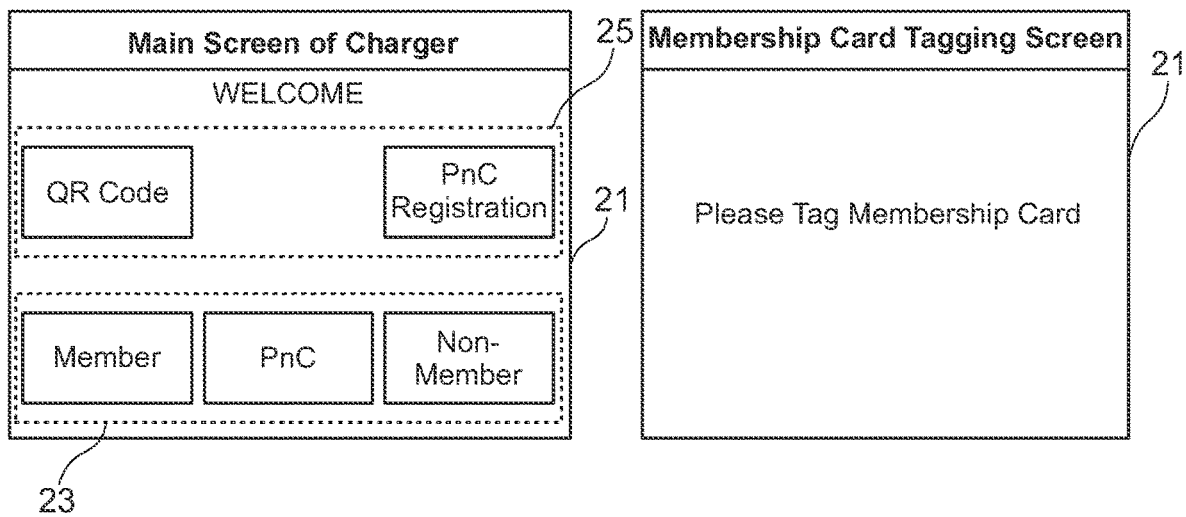

First, as illustrated in FIG. 5, in the case of only membership registration having been performed, when the customer 40 selects the 'member' of the member authentication unit 23 displayed on the main screen 21 of the charger, a message 'Please tag your membership card.' is displayed on the main screen 21 of the charger. Accordingly, when the membership card is tagged by a reader of the charger 20, the charger 20 transmits a membership number of the membership card to the management server 10, and the management server 10 approves the member when the member is a registered member, so that the charger 20 starts charging the vehicle 1.

In this case, for the charging, at the same time as the charger 20 is connected to the charging coupler of the vehicle 1, the charger 20 extracts the MAC address from the vehicle 1 through the charging cable 3. The extracted MAC address of the vehicle 1 is transmitted to the management server 10, and the management server 10 matches the MAC address of the vehicle 1 with customer information and performs an update to store and manage the charging history of the vehicle 1.

In the above description, a membership card is issued through the membership registration, and when the charging system according to the present invention is used, simple charging may be performed using the issued membership card. However, when the customer is a member but does not carry the membership card, charging cannot be performed. In order to eliminate such an inconvenience, when the PnC membership registration according to the present invention is performed, authentication, approval, charging, and payment may be performed through a MAC address of the vehicle 1 extracted by only a connection of the charger 20 and a charging coupler of the vehicle 1. Therefore, it is preferable to allow the customer 40, who has only registered as a member, to register for the PnC membership so that the inconvenience described above is resolved.

Figure 6:
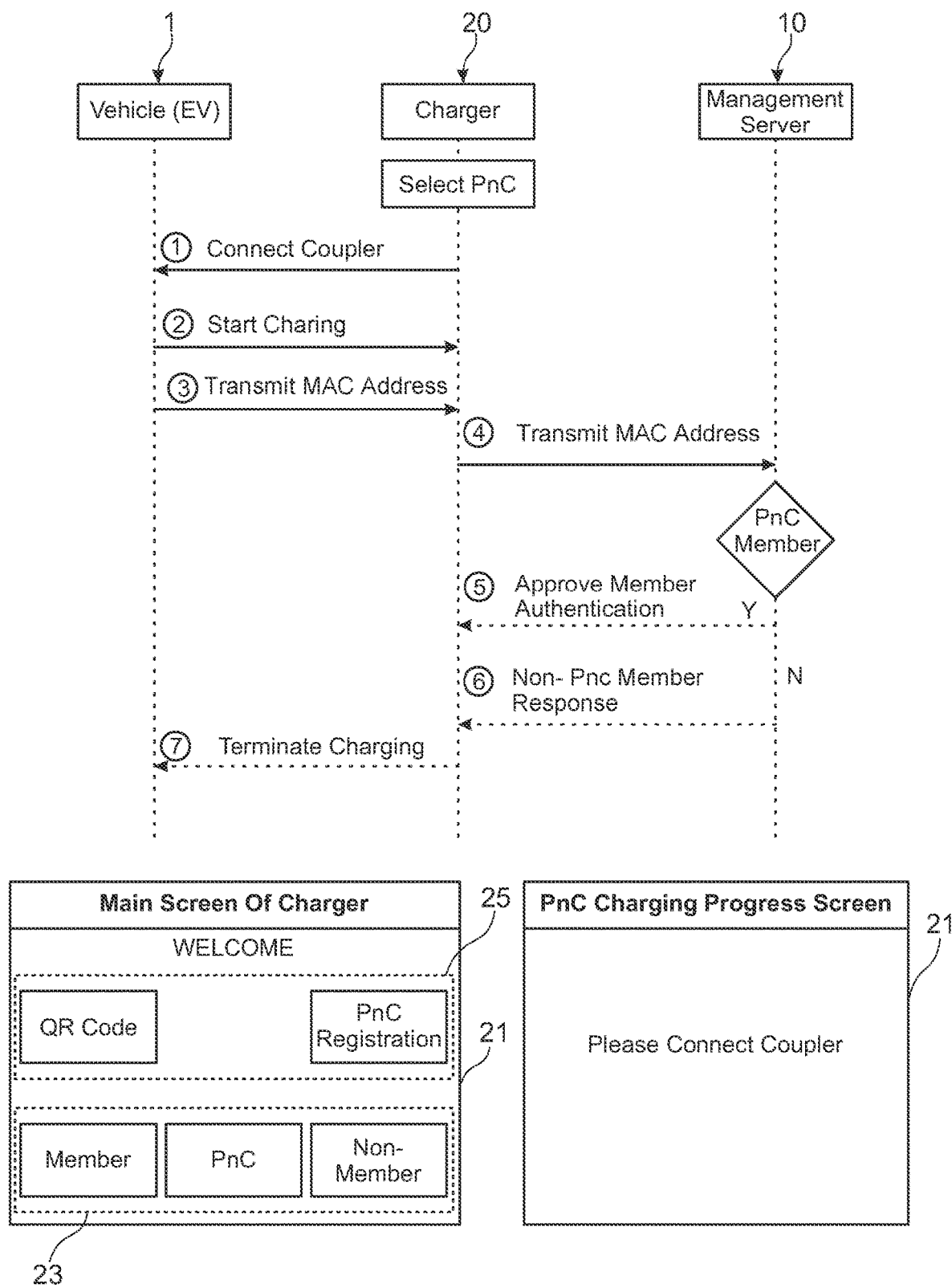
FIG. 6 is a conceptual diagram illustrating a PnC member charging procedure in the charging system according to the present invention.

Next, as illustrated in FIG. 6, when a customer having registered for the membership and the PnC membership selects the 'PnC' displayed on the main screen 21 of the charger, a message 'please connect the coupler' is displayed on the main screen 21 of the charger. Accordingly, when the charger 20 is connected to the charging coupler of the vehicle 1, at the same time as the connection of the charging coupler, charging is started, and a MAC address extracted from the vehicle 1 is transmitted through the charger 20 to the management server 10.

In this case, the management server 10 identifies whether the customer is a PnC member through the transmitted MAC address, and in response to the customer being identified as a PnC member, approves the member authentication, and continues charging.

However, in the case of non-PnC member, the management server 10 rejects the approval in the form of non-PnC member response to the charger 20, and the charger 20 terminates charging. That is, when accessing the 'PnC' registered as a member and PnC member during the authentication process, the management server 10, in the case of non-PnC member, transmits a response rejecting authentication and approval to the charger 20, and the charger 20 terminates the charging. In this case, the customer 40, when only desiring to maintain the membership registration state, may select the 'member' of the member authentication unit 23 as described above and follow the charging procedure, and when desiring to register as a PnC member, may select the 'PnC registration' of the membership registration unit 25 and register as a PnC member.

Figure 7:
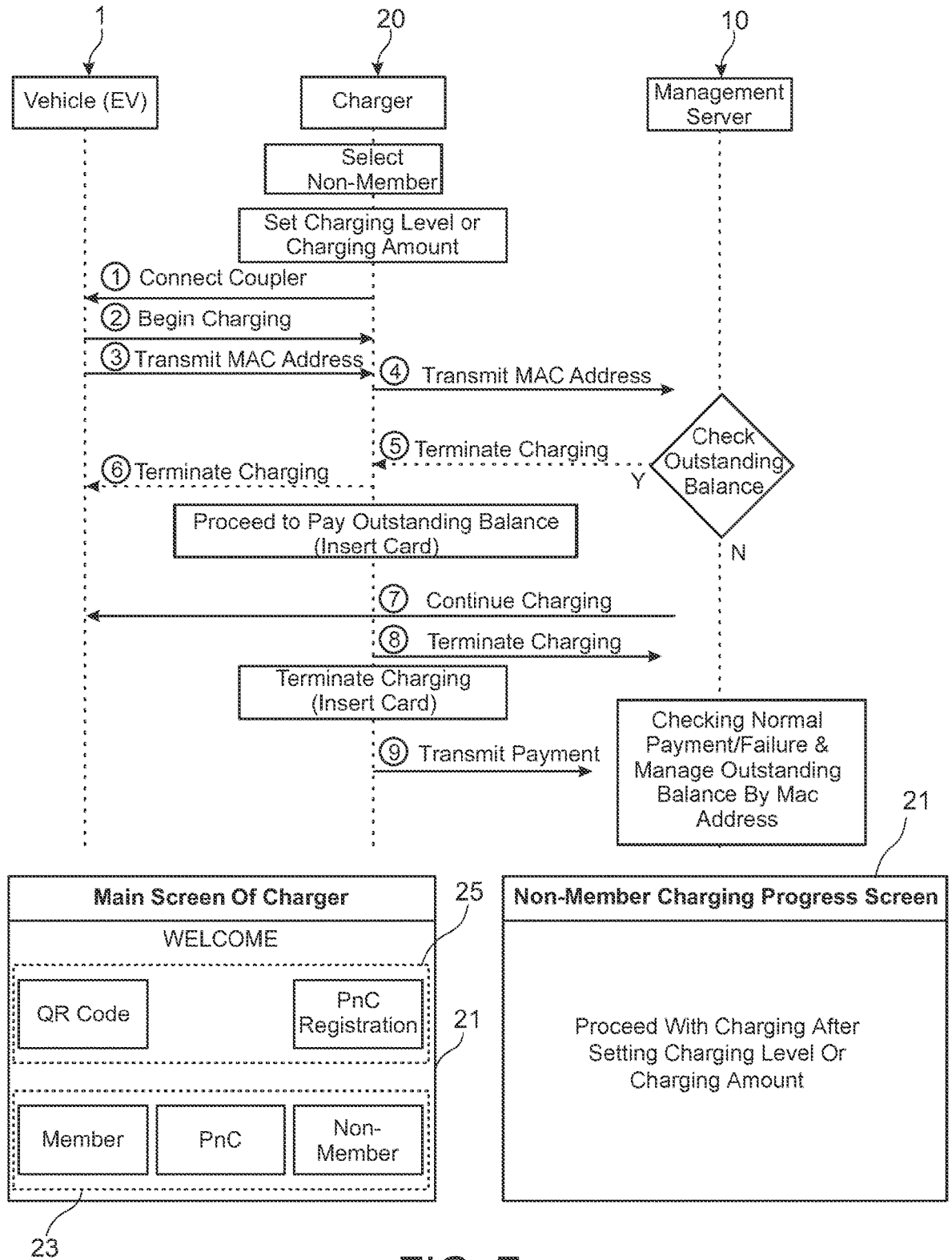
FIG. 7 is a conceptual diagram illustrating a non-member charging procedure in the charging system according to the present invention.

Furthermore, as illustrated in FIG. 7, when the customer 40 using the charging system according to the present invention desires to perform charging in a state of a non-member who is not registered as a member, the customer 40 may perform charging by selecting the 'non-member' in the member authentication unit 23. In the case of the non-member charging, when the 'non-member' is selected in the member authentication unit 23, a message 'charging proceeds after setting the charging level or charging amount money' is displayed on the main screen 21 of the charger 20. Accordingly, after setting the charging level or the charging amount money on the main screen 21 of the charger, the customer 40 connects the charger 20 to the charging coupler of the vehicle 1 for charging so that charging is performed, and when the charging is completed, the customer 40 inserts a credit card into a card reader provided in the charger 20 to perform post-paid payment so that the charging is terminated.

In this case, whether the customer 40 is a non-member or there is an outstanding balance is checked. In the charging system according to the present invention, at the same time as the charger 20 is connected to the charging coupler of the vehicle 1, the charging is initiated, and the extracted MAC address of the vehicle 1 is transmitted to the management server 10 through the charger 20. In this case, the management server 10 stores and manages the extracted MAC address in the database. That is, when the charging system according to the present invention is used, the charging history of the vehicle 1 is stored by storing and managing the MAC address extracted from the vehicle 1. Therefore, even in the case of a non-member, the charging history of the vehicle 1 may be checked with only one time use of the charging system according to the present invention, and in this case, when the vehicle 1 has not paid in the past or only partially paid, that is, when there is an outstanding balance, an action may be taken. The outstanding balances may be incurred because the charging system according to the present invention uses the post-paid payment system even for a non-member, in which there is a possibility that the customer 40 may not pay due to negligence or intention after charging is completed, or a payment may fail due to using a card that has been suspended or other reasons. In this case, the presence of outstanding balances for the vehicle 1 of the non-member may be checked by updating and storing information about outstanding accounts in the MAC addresses stored and managed as described above.

As described above, in response to the presence of an outstanding balance after the charging is initiated as a non-member, the charging is terminated, and when a payment card of the customer 40 is inserted into the card reader for payment of the outstanding balance, the charging is continued and terminated. In this case, when the charger 20 transmits payment information to the management server 10, the management server 10 updates the information about the outstanding balance in the MAC address of the corresponding vehicle 1 and stores the updated information.

In addition, in the case of a non-member or member who has an outstanding balance, the outstanding balance may be immediately paid through a dedicated application installed on the smartphone of the customer so that the charging is continued.

As illustrated in FIGS. 1, 2 and 5, the step (e) (S500) according to the present invention is a process of, after charging according to the step (d) (S400), transmitting payment information to the terminal of the customer 40 and terminating the charging through payment approval.

In the step (e) (S500), when the charging is terminated according to a normal procedure, the charger 20 transmits a charging termination and a payment request amount to the management server 10, and the management server 10 transmits payment information, that is, a payment amount, to the smart phone of the customer 40. Thereafter, the customer 40 confirms the transmitted payment information and approves the payment so that simple payment through the payment system 30 is achieved. As a result, the charging procedure is terminated.

Furthermore, the charging system according to the present invention is different from the payment method of the conventional charging system in that, when the charging amount money is paid with a credit card regardless of the member type, the membership registration state, or the PnC membership registration state, post-paid payment is performed after the charging is completed. That is, because the credit card number is not allowed to be stored for the credit card post-paid payment system according to a credit law, the post-paid payment system was substantially not implementable. However, in the case of the charging system according to the present invention, the payment, after completion of the charging, is performed by checking the payment amount and directly tagging the card on the card reader provided in the charger without storing the credit card number, and thus a post-paid payment is achieved. Therefore, the charging system according to the present invention is convenient by more realistically ensuring the convenience of customers.

As described above, the charging system according to the present invention omits a preceding procedure for payment, and at the same time as the charger is connected to the charging cable of the vehicle, enables charging, and as soon as the charging is completed, transmits payment information to the customer for the payment information to be checked so that improved service is provided to customers.

Although the present invention has been described with reference to the exemplary embodiments shown in the drawing, those of ordinary skill in the art should appreciate that various modifications and alterations may be made from the embodiments.

Therefore, the scope of the present invention should be defined by technical sprit of the appended claims of the present invention.

DESCRIPTION OF REFERENCE NUMBERS

1: Vehicle
3: Charging cable
10: Management server
20: charger
21: main screen
23: member authentication unit
25: Membership registration unit
30: payment system
40: customer
50: dedicated application

The invention claimed is:
1. A charging system for member authentication, charging, and payment, which includes a management server (10), a charger (20), and a payment system (30), the charging system allowing the performance of the steps of:
 (a) in response to a member authentication unit (23) and a membership registration unit (25) displayed on a main screen (21) of the charger (20) being selected, authenticating a member or initiating a membership registration procedure (S100);
 (b) in a case of a registered member or after registering a payment device in the payment system (30) and providing the payment system (30) with customer information according to the membership registration procedure to perform membership registration, identifying whether to register for a plug and charge (PnC) membership and, for the PnC membership registration, connecting the charger (20) to a charging coupler of a vehicle (1) to extract a Media Access Control (MAC) address of the vehicle (1) (S200);

(c) from the extraction of the MAC address of the vehicle (1), allowing a dynamic quick response (QR) code to be generated on the main screen (21) of the charger (20) and, through recognition of the dynamic QR code by a terminal of a customer (40), matching the MAC address of the vehicle (1) with the customer information obtained at the time of membership registration and performing an update (S300);

(d) in response to being authenticated as a member in the step (a) (S100) or according to whether the membership registration has been performed or the PnC membership registration has been performed in the step (b) (S200) and the step (c) (S300), initiating charging (S400); and (e) after the charging according to the step (d) (S400), transmitting payment information to the terminal of the customer (40) and terminating the charging through payment approval (S500).

2. The charging system of claim 1, wherein, when member in the member authentication unit (23) is selected, when a membership card possessed by the customer (40) is tagged on the charger (20), a membership number of the membership card is transmitted to the management server (10) to approve member authentication, and when the charger (20) is connected to the charging coupler of the vehicle (1), charging is initiated and a MAC address is extracted from the vehicle (1) and transmitted to the management server (10), wherein the management server (10) matches the MAC address of the vehicle (1) with customer information and performs an update.

3. The charging system of claim 2, wherein after the charging is completed, the payment information is transmitted to the terminal of the customer (40), and the charging is terminated by the payment.

4. The charging system of claim 1, wherein, in a case in which PnC member in the member authentication unit (23) is selected, when the charger (20) is connected to the charging coupler of the vehicle (1), charging is initiated and a MAC address is extracted from the vehicle (1) and transmitted to the management server (10) so that member authentication is approved, wherein, in response to non-PnC member, the management sever (10) transmits a response indicating the non-PnC member to the charger (20) and the charger (20) terminates charging.

5. The charging system of claim 4, wherein the non-PnC member selects PnC registration in the membership registration unit (25) to perform the PnC membership registration, the charging, and the payment procedures according to steps (b) to (e).

6. The charging system of claim 4, wherein after the charging is completed, the payment information is transmitted to the terminal of the customer (40), and the charging is terminated by the payment.

7. The charging system of claim 1, wherein, in a case in which non-member in the member authentication unit (23) is selected, a charging level or a charging amount money is set in the charger (20), and the charger (20) is connected to the charging coupler of the vehicle (1) so that charging is initiated, and a MAC address is extracted from the vehicle (1) and transmitted to the management server (10) so that, in response to the MAC address being present in an updated database in the management server (10), presence of an outstanding balance for the MAC address of the vehicle (1) is checked.

8. The charging system of claim 7, wherein, in response to no outstanding balance for the MAC address of the vehicle (1), the payment information is transmitted to the terminal of the customer (40) along with termination of the charging.

9. The charging system of claim 8, wherein after the payment information is transmitted to the terminal of the customer (40), whether the payment is normally performed is checked, and in response to the payment not being performed or only a partial payment having been performed, an update is performed on outstanding balance information for the MAC address of the vehicle (1).

10. The charging system of claim 7, wherein, in response to the presence of the outstanding balance for the MAC address of the vehicle (1), the charging is terminated, and through a payment process for the outstanding balance, the charging is continued.

11. The charging system of claim 1, wherein after the charging is completed in the charger, in a case in which the customer pays a charging amount money using a credit card, postpaid payment is allowed.

* * * * *